(No Model.)

A. E. HERMAN.
VEHICLE BRAKE.

No. 304,430. Patented Sept. 2, 1884.

Witnesses
Harry J. Beatty.
Chas. F. Day

Inventor
Adolph E. Herman
By Bradford Howland
Attorney

United States Patent Office.

ADOLPH E. HERMAN, OF RAVENNA, OHIO, ASSIGNOR OF ONE-HALF TO HENRY W. RIDDLE, OF SAME PLACE.

VEHICLE-BRAKE.

SPECIFICATION forming part of Letters Patent No. 304,430, dated September 2, 1884.

Application filed April 24, 1884. (No model.)

*To all whom it may concern:*

Be it known that I, ADOLPH E. HERMAN, a citizen of the United States, residing at Ravenna, Portage county, Ohio, have invented a new and useful Improvement in Vehicle-Brakes, of which the following is a specification.

My invention consists in the part of the brake which is applied to the wheel being connected to the lever which operates it by a series of rods at angles to each other and hinged to oscillating struts, the lever being provided with a peculiar device for locking and unlocking the brake, hereinafter described.

Figure 1:
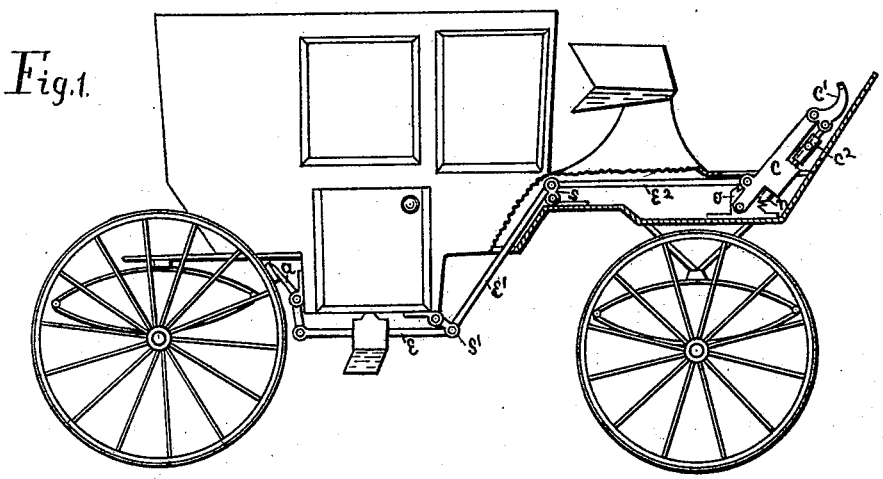
Figure 2:
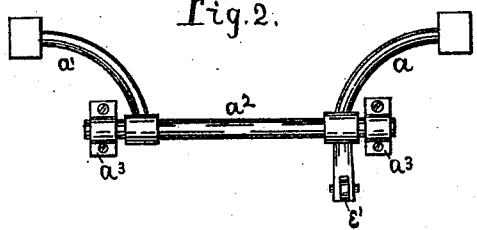
Figure 3:
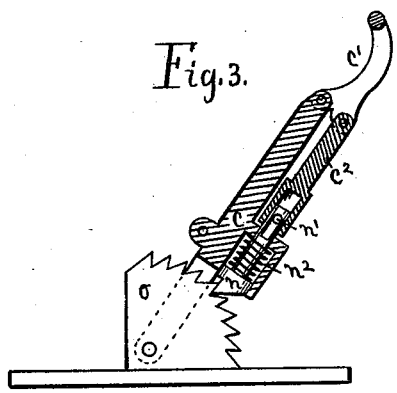

In the drawings forming a part of this specification, Figure 1 is a side elevation of a coach to which my newly-invented brake is applied. Fig. 2 represents, on an enlarged scale, a rear view of the part of the brake which is applied to the wheels; and Fig. 3 represents, on an enlarged scale, the curved rack and lever for operating the brake, partly in section.

My invention herein described is more particularly adapted to coaches and carriages. The part of the brake which is applied to the wheels consists of lever $a$ and arm $a'$, attached to rod $a^2$. Rod $a^2$ turns in boxes $a^3$ $a^3$, attached to the vehicle. Lever $a$ is connected with the operating-lever $c$ by a series of jointed rods, $e$ $e'$ $e^2$, hinged to the levers, and also to oscillating struts $s$ $s'$, where the rods form angles with each other.

The principal object of using the jointed rods $e$ $e'$ $e^2$, connected with swinging struts $s$ $s'$, is that they may be placed out of the way under the bottom of the coach, and conform substantially to its shape, and at the same time avoid all lateral strain on the rods.

In the general form of coach illustrated in the drawings, I prefer to have rod $e^2$ and the upper part of rod $e'$ with their jointed strut $s$ within the box or body of the coach, as shown in Fig. 1. Struts $s$ $s'$ are hinged to the body of the coach and to rods $e$ $e'$ $e^2$, where the rods are jointed at angles to each other. Lever $c$ is formed with a handle consisting of a short lever, $c'$, pivoted to and forming a part of lever $c$, and also pivoted to rod $c^2$, whose lower end is formed with a socket to receive catch $n$. Catch $n$ is a sliding rod, slotted near its upper end to receive pin $n'$, which extends through and is held in rod $c^2$. Catch $n$ is thus slotted to allow it to slide upward and compress spring $n^2$ when the lower end of the catch passes over the teeth of the curved rack $o$ on forcing forward lever $c$ to apply the brake to the wheels. The lower end of lever $c$ is pivoted to rack $o$, which is attached to the inside of the bottom of the front part of the coach, the upper side or floor being slotted to allow movement of lever $c$. The lower part of lever $c$ is slotted to receive rack $o$, and also formed with a socket to receive catch $n$ and spring $n^2$. The brake is applied to the wheels by forcing forward lever $c$, which may be done by pressing the foot against lever $c$ below handle $c'$. When lever $c$ is moved forward, catch $n$ is forced up by the teeth of rack $o$ and compresses spring $n^2$. When the brake has been thus applied, it is locked by catch $n$, which is held in the teeth of rack $o$ by spring $n^2$. Spring $n^2$ is not absolutely essential for this purpose, as the weight of catch $n$ may be sufficient to cause it to fall between the teeth of rack $o$ and lock the brake. In releasing or unlocking the brake, the driver of the vehicle should pull on handle $c'$, thereby withdrawing catch $n$ from rack $o$, and allowing rod $c$ to be turned backward.

I claim as my invention—

1. In a vehicle-brake, the combination of the part of the brake which is applied to the wheels with its operating-lever by intermediate rods at angles to each other, and hinged to oscillating struts, substantially as described.

2. The combination of the part of the brake which is applied to the wheels with its operating-lever by intermediate rods, $e$ $e'$ $e^2$, hinged to oscillating struts $s$ $s'$, the strut $s$, rod $e^2$, and lower part of the operating-lever being inclosed in the vehicle-box, substantially as described.

3. Lever $c$, formed with a socket near its lower end to receive catch $n$ and spring $n^2$, and provided with the catch and spring, rod $c^2$, formed with a socket in its lower end to receive the slotted upper end of catch $n$, with which it is connected by pin $n'$, and handle $c'$, pivoted to lever $c$ and rod $c^2$, in combination with rack $o$, substantially as described.

ADOLPH E. HERMAN.

Witnesses:
GEO. I. ROBINSON,
BRADFORD HOWLAND.